(12) United States Patent
Feinbloom et al.

(10) Patent No.: US 12,429,713 B1
(45) Date of Patent: Sep. 30, 2025

(54) METHOD OF LOUPE ASSEMBLY AND EYEWEAR INCORPORATING SAID LOUPE ASSEMBLY THEREIN

(71) Applicant: Designs for Vision, Inc., Bohemia, NY (US)

(72) Inventors: Richard E. Feinbloom, New York, NY (US); Matthew D. Siedman, Babylon, NY (US); Samantha A. Silver, New York, NY (US)

(73) Assignee: Designs for Vision, Inc., Bohemia, NY (US)

( * ) Notice: Subject to any disclaimer, the term of this patent is extended or adjusted under 35 U.S.C. 154(b) by 538 days.

(21) Appl. No.: 17/894,964

(22) Filed: Aug. 24, 2022

Related U.S. Application Data

(60) Provisional application No. 63/348,644, filed on Jun. 3, 2022.

(51) Int. Cl.
*G02C 7/08* (2006.01)
*G02B 25/00* (2006.01)

(52) U.S. Cl.
CPC ........... *G02C 7/088* (2013.01); *G02B 25/004* (2013.01)

(58) Field of Classification Search
None
See application file for complete search history.

(56) References Cited

U.S. PATENT DOCUMENTS

| 9,280,033 | B2 | 3/2016 | Feinbloom | |
|---|---|---|---|---|
| 9,400,366 | B2 | 7/2016 | Feinbloom | |
| 10,437,041 | B1* | 10/2019 | Feinbloom | G02B 27/027 |
| 2006/0256429 | A1* | 11/2006 | Obrebski | G02B 26/005 |
| | | | | 359/368 |

* cited by examiner

*Primary Examiner* — Robert E. Tallman
(74) *Attorney, Agent, or Firm* — Law Office of Carl Giordano, PC

(57) ABSTRACT

A method of assembly of a magnification device formed having a first section and a second section, wherein within each of the first section and the second section are formed a plurality of ridges and a plurality of spaces therebetween, inserting optical components with the formed spaces and joining the first and second sections together and an eyepiece assembly is slidably engageable into a proximate end of the magnification device to focus an object a known distance from a distal end of the magnification device. Further discloses is an eyewear incorporating the assembled magnification devices.

18 Claims, 17 Drawing Sheets

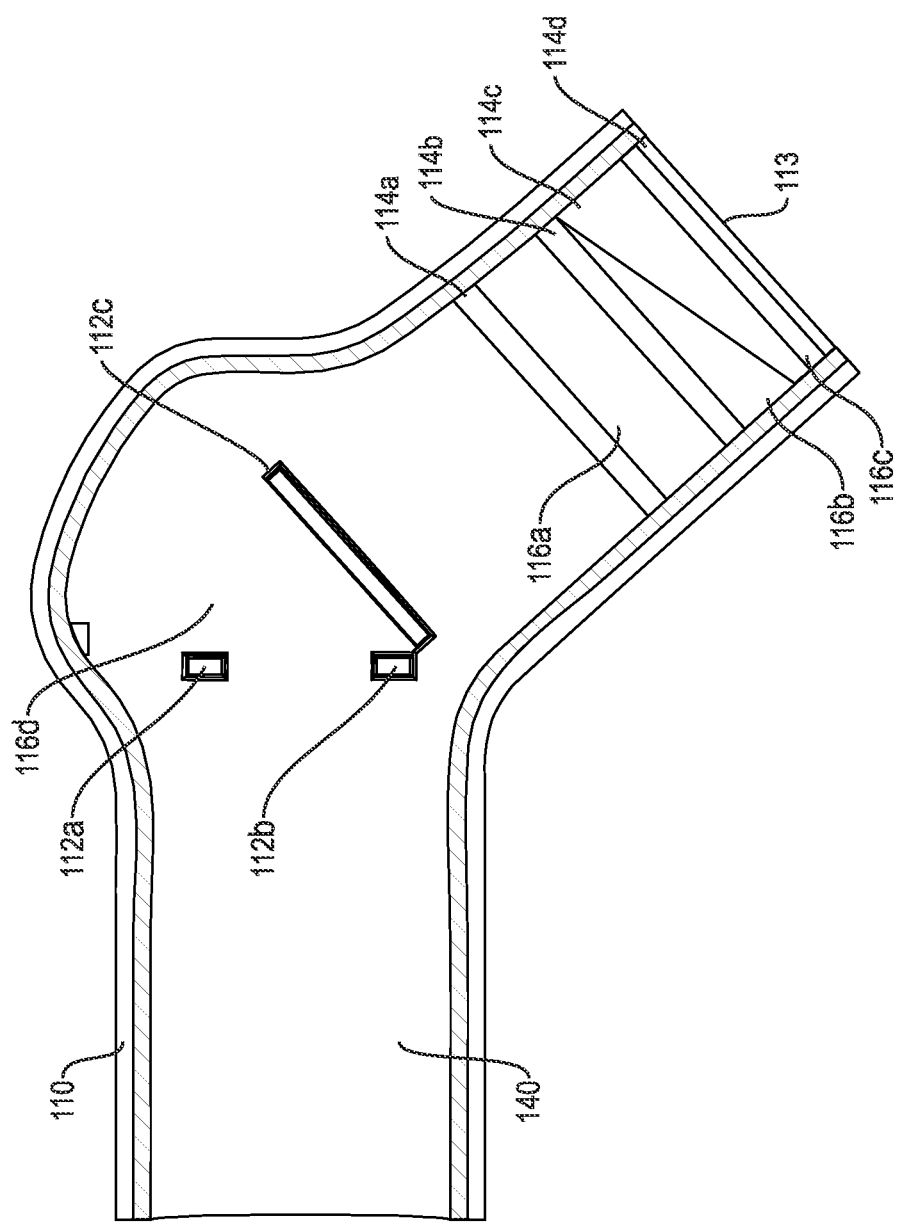

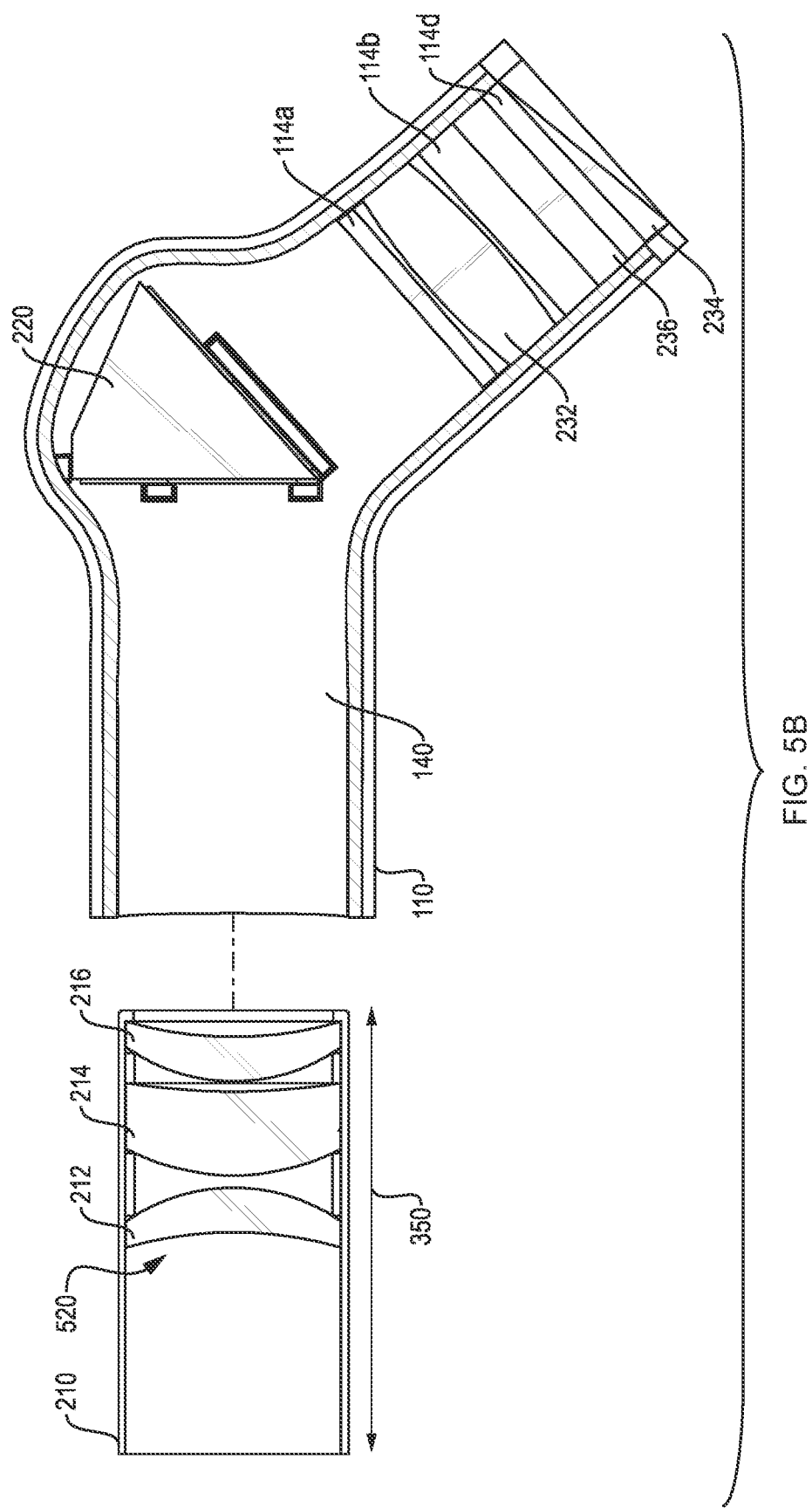

METHOD OF LOUPE ASSEMBLY AND EYEWEAR INCORPORATING SAID LOUPE ASSEMBLY THEREIN

CLAIM OF PRIORITY

The applicant claims, pursuant to 35 USC 119, priority to and the benefit of the earlier filing date of U.S. Provisional Patent Application Ser. No. 63/348,644, filed on Jun. 3, 2022, the contents of all of which are incorporated, in their entirety, herein.

BACKGROUND OF THE INVENTION

Field of the Invention

This invention relates to the field of medical examination devices and more particularly to devices utilizing magnification devices (i.e., loupes) within eyewear.

Background Information

Head-borne magnification devices (hereafter referred to as Loupes) are well-known in the medical and dental fields, in addition to other fields, to provide for magnification of objects being viewed through the loupes. For example, surgeons utilize loupes to view magnified images during surgical procedures to obtain an enlarged and more detailed view of an area that the surgeon is operating on. Dentists and/or dental surgeons utilize loupes to view an area within a patient's mouth to obtain an enlarged and more detailed view of an area of a patient's oral cavity. Similarly, dermatologists and cosmologists may also use loupes to obtain an enlarged and more detailed view of a patient's skin.

The current technology for the assembly of loupes requires a manufacturing process that is labor extensive and high-cost, as the components comprising the loupes are generally assembled through the use of screw threads, wherein the objective and eye lens assemblies are screwed into a housing that includes matching screw threads.

However, this method of assembly of loupes requires the manufacture of components that include screw threads to complete the assembly of the loupe element.

Hence, there is a need in the industry for a method of loupe assembly that is more cost efficient and less user intensive than the current state of the art.

SUMMARY OF THE INVENTION

Disclosed is a method for assembling the components of a loupe without the use of screw threads and the use of the assembled loupe within eyewear that overcome problems in conventional loupe incorporated eyewear.

In one aspect of the invention, a clam-shell design loupe includes a first and a second housing elements, which when joined forming a housing element, wherein each of the first and the second housing element include a plurality of matching ridge elements that form a plurality of regions into which components of the loupe may be placed. The first and the second housing elements may be joined together to form a loupe element.

In one aspect of the invention, a clam-shell design loupe includes a first and a second housing element into which a slidable eyepiece lens assembly may be inserted, wherein the slidable eyepiece lens assembly provides for the focusing of the loupe to a known or desired focal point.

In one aspect of the invention, a clam-shell design loupe includes a first and a second housing element, including components placed within ridge elements, formed on each of the first and second housing elements, wherein when the first and the seconding housing elements are joined together, the components placed within the ridge elements are held in place and wherein a slidable eyepiece assembly, placed within a proximal section of the joined first and second housing elements, may be positioned to cause an object at a known distance to be in focus to a person viewing the object through said loupe.

In one aspect of the invention, a first and a second housing element may be joined by one of a snap-fit connection, a glued connection or an ultra-sonic welding, wherein a slidable lens assembly may be fixedly placed within the assembled first and second housing elements through a screw lock, a pin lock or a glued connection to establish a correct focus at a known point from a distal end of the assembled optical system.

In another aspect of the invention, a prismatic telescopic lens eyewear configurations is disclosed wherein the prismatic telescopic lenses are in a parallel relationship to each other wherein a wedge prism is introduced into an optical path to cause the convergence of the light to create a binocular image of an object at a known known distance.

Reference is made to the accompanying drawings. It is stressed that the particulars shown are by way of example only and for purposes of illustrative discussion of the preferred embodiments of the present disclosure and are presented to clarify the most useful and readily understood description of the principles and conceptual aspects of the invention. In this regard, no attempt is made to show structural details of the invention in more detail than is necessary for a fundamental understanding of the invention or to provide for appropriate sizing of the elements disclosed.

The description taken with the drawings making apparent to those skilled in the art show how the several forms of the invention may be embodied in practice.

BRIEF DESCRIPTION OF THE DRAWINGS

The advantages, nature, and various additional features of the invention will appear more fully upon consideration of the illustrative embodiments described in detail in connection with the accompanying drawings, where like or similar reference numerals are used to identify like or similar elements throughout the drawings:

FIG. 1D illustrates an enlarged view of the exemplary embodiment of the loupe shown in FIG. 1C.

FIG. 5B illustrates a side view of another exemplary embodiment of the loupe shown in FIG. 1A.

It is to be understood that the figures, which are not drawn to scale, and descriptions of the present invention described herein have been simplified to illustrate the elements that are relevant for a clear understanding of the present invention, while eliminating, for purposes of clarity, many other elements. However, because these omitted elements are well-known in the art, and because they do not facilitate a better understanding of the present invention, a discussion of such elements are not provided herein. The disclosure, herein, is directed also to variations and modifications known to those skilled in the art.

DETAILED DESCRIPTION OF THE INVENTION

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description, herein, should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instance, the terms "about" may include numbers that are rounded (or lowered) to the nearest significant figure.

Figure 1A:
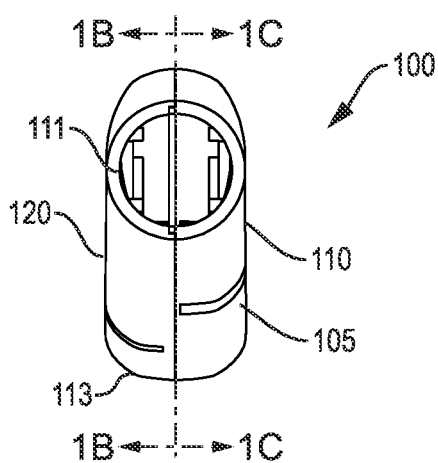
FIG. 1A illustrates a prospective view of an exemplary embodiment of a loupe in accordance with the principles of the invention.

FIG. 1A illustrates a prospective view of an exemplary embodiment of a loupe 100 comprising a housing into which optical components are placed to provide a desired level of magnification of images being viewed, in accordance with the principles of the invention.

In this illustrated embodiment, loupe 100 comprises a housing 105 comprising a proximal end 111 (where proximal end refers to the end being closest to a user's eye) and a distal end 113 (where distal end refers to the end being furthest from a user's eye), wherein loupe housing 105 is composed of two elements; a first section 110 and a second section 120, wherein the first section 110 and second section 120 are mirror images of each other. The construction of loupe 100, is achieved, as would be understood, when first section 110 and second section 120 are joined together after optical components are placed, therein. In one aspect of the invention, first section 110 and second section 120 may be joined together through a snap fit connection. Alternatively, first section 110 and second section 120 may be joined together utilizing a glued connection. In still a further aspect of the invention, first section 110 and second section 120 may be joined together with an ultra-sonic weld connection.

Figure 1B:
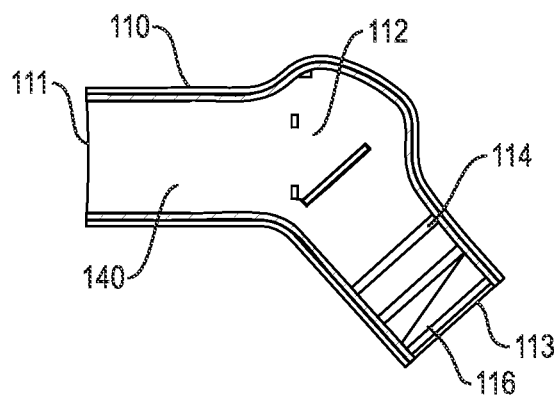
FIGS. 1B and 1C illustrate side views of the exemplary embodiment of the loupe shown in FIG. 1A.
Figure 1C:
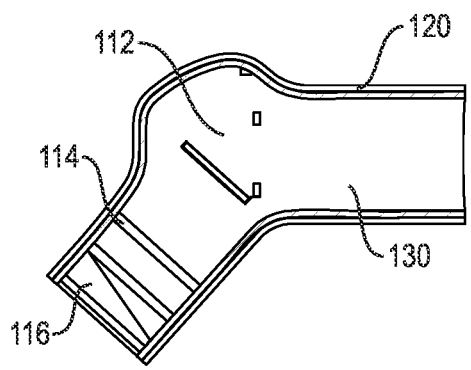

FIGS. 1B and 1C illustrate right and left side views of the exemplary loupe 100, respectively, shown in FIG. 1A each of left section 120 and right section 110 comprises an internal surface 130, 140. In this illustrated embodiment each of internal surfaces 130, 140 comprise a plurality of ridge (or rib) elements 112, 114 molding therein. Ridge elements 112, 114 provide for the forming of a plurality of pockets or spaces 116 within the inner surfaces of 130 and 140, wherein the combination of the ridge element size and placement within the internal surface (130, 140) provides for an appropriate placement to optical components to achieve a desired level of magnification, for example, when combined with an eyepiece lens assembly.

FIG. 1D illustrates an expanded side view of exemplary inner surface 140 shown in FIG. 1B providing further details of the ridges 112, 114 and spaces or pockets 116.

In this illustrated expanded side view ridge 112 comprises ridges or stops 112a, 112b and 112c, forming space 116d, therebetween. Ridges or stops 112a-112c are arranged in a triangular shape-so as to retain a triangular prism element (not shown), which as will be discussed alters (or bends) the direction of light transmitted through loupe 100. Ridges or stops 114, comprise ridges 114a-114d, form spaces or pockets 116a-116c, therebetween. Pockets 116a-116c provide areas into which optical components associated with loupe 100, may be placed and retained, as will be discussed.

Although not shown, it would be recognized that the inner surface 130 of the exemplary embodiment of the section 120 shown in FIG. 1C comprises ridges 112, 114 forming spaces 116a-116c matching those shown in FIG. 1D (i.e., a mirror image). Ridges 114 are shown in a substantially parallel configuration, which are substantially perpendicular to light entering a distal end 113 of loupe 100. In addition, ridge 112c is shown being substantially parallel to ridge 114a.

Further, illustrated is ridge 114c and space or pocket 116b, which are shown as opposing (right) triangular structures. Pocket 116b is formed to accommodate a wedge or base-in prism element, which as will be discussed alters a path of light through loupe 100. Specifically, wedge prism 234 (see FIG. 2) is essentially a right-angled triangular optical element having a base element 233, a first surface 237 perpendicular to the base element (i.e., a leg) and a hypotenuse 235, wherein the first surface 237 and the hypotenuse 235 form an angle opposite the base element 233 and hypotenuse 235 faces working distance lens 236

Figure 1E:
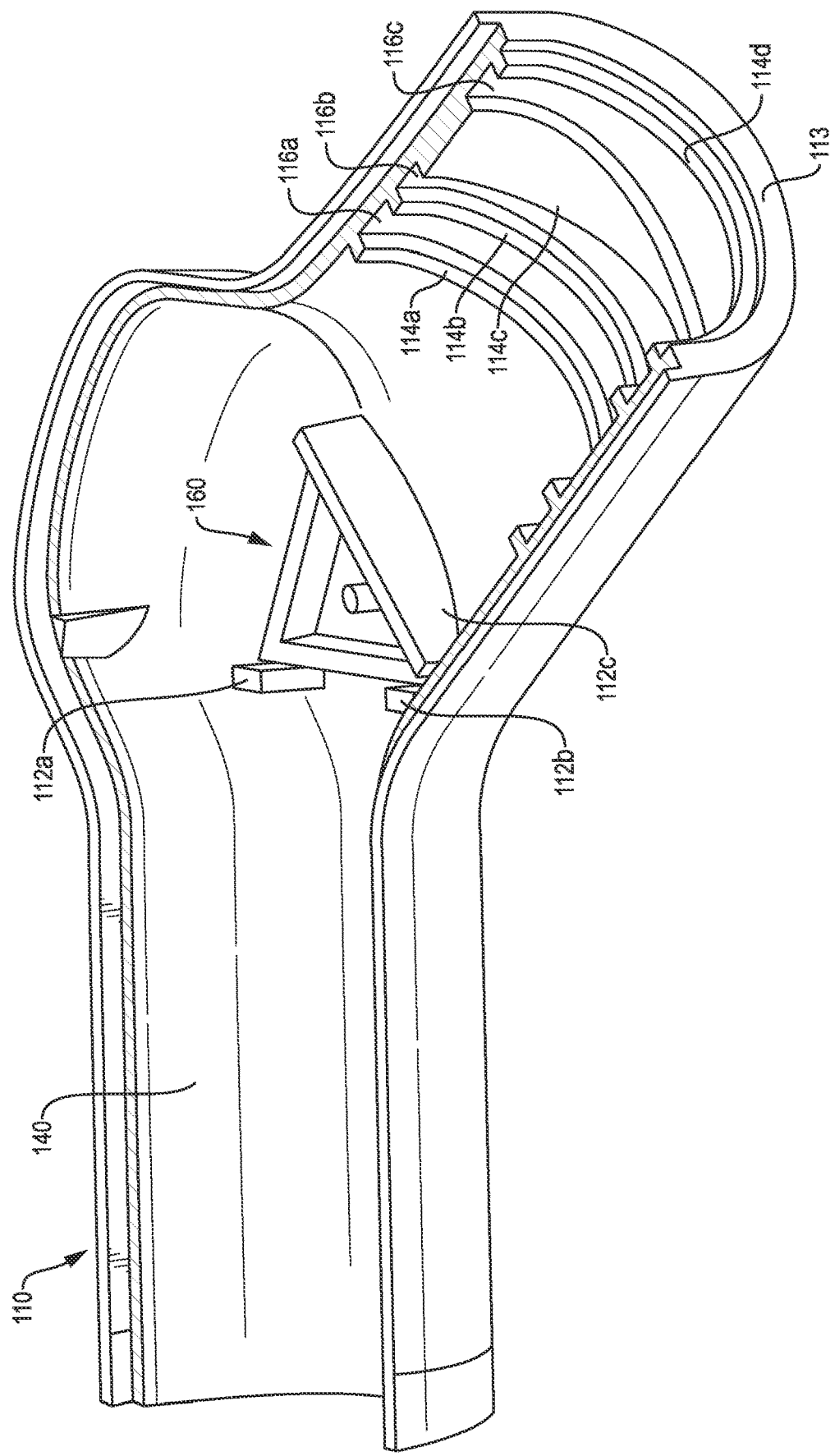
FIG. 1E illustrates a cut-away perspective view of the loupe shown in FIG. 1A.

FIG. 1E illustrates a cut-away perspective view of the right section 110 of loupe 100 shown in FIG. 1B.

In this illustrated embodiment, ridges 114a-114d projection from an interior surface 140 of a distal portion of loupe 100, wherein ridges 114a-114d create a plurality of spaces or pockets 116a-116c therebetween. In accordance with the principles of the invention, the created pockets are formed along parallel lines, wherein ridge element 114c is formed in a manner to be complementary to, (i.e., oppositely opposing) a desired shape of a wedge or base-in prismatic element (not shown) such that the not-shown prismatic element is retained in place.

Further shown and not shown previously is ledge element 160 formed within space 116 between ridges 112a-112c. Ledge element 160 provides for the proper positioning of the not-shown prismatic lens within ridges 112a-112c. Accordingly, the height of the walls of ledge element 160 may be determined based, in part, upon the thickness of the not-shown prismatic element.

Figure 2:
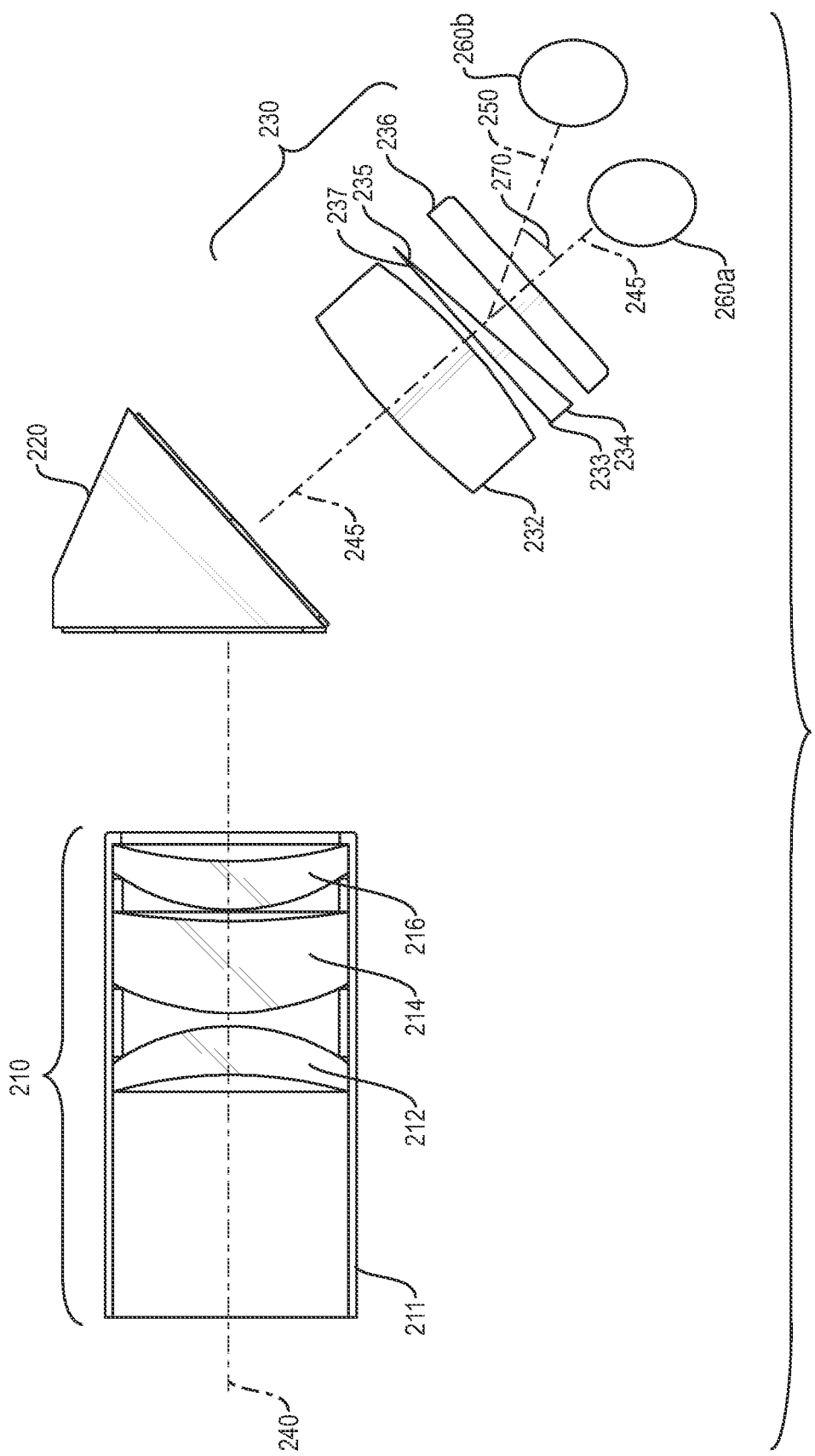
FIG. 2 illustrates exemplary components of the exemplary embodiment of the loupe shown in FIG. 1A.

FIG. 2 illustrates a side view of exemplary optical components suitable for forming loupe 100 in accordance with the principles of the invention.

In this illustrated example, eyepiece assembly 210, prismatic lens 220 and objective lens section 230 may be incorporated into the exemplary loupe housing 105, shown in FIG. 1A, to form loupe 100. Components of eyepiece 210 and objective lens section 230 may be selected to achieve a desired level of magnification for loupe 100.

In this illustrated embodiment, eyepiece assembly 210 comprises housing 211 into which are a plurality of lens 212, 214, 216 (wherein lens 212 and 216 may be the same or different elements) that define an optical axis 240 along which light emanating from an object may be viewed. Eyepiece assembly 210 provides for the focusing of the light along optical axis 240, as will be discussed.

Further illustrated is prismatic lens 220, which as would be understood the art, alters the direction light that is viewed through objective lens section, 230. In one aspect of the invention, light emanating from object 260a is directed along optical path 245 through objection lens section 230, wherein the optical path is then altered to be along optical path 240 through eyepiece assembly 210.

Objective lens section 230 comprises at least one objective lens 232 and working distance lens 236. Working distance lens 236 operates to focus light emanating from object 260a passing through objective lens section 230 along optical axis 245.

In one aspect of the invention, wedge, base-in or collimating prism 234 may be positioned within loupe 100, wherein wedge prism 234 is configured to alter a direction of light passing through objective lens 232. For example, with wedge prism 234 in place, light emanating from object 260b is passed to objective lens section 230 along optical path 250 In one aspect of the invention, wedge prism 234 may be constructed to cause optical path 250 to deviate from optical path 245 by a known angle of deviation 270. The known angle of deviation 270 may be determined, in part, based on a distance of object 260b from working distance lens 236.

In one aspect of the invention working distance lens is preferably a Plano/convex lens, where the Plano face of lens 236 faces the leg element of base-in prism 234. In a preferred embodiment working distance lens 236 may be of a +2.50 power. However, other powers may be selected without altering the scope of the invention claimed. In addition, while a Plano/convex lens is preferred it would be recognized that other types of lens may be utilized as working distance lens 236. For example, a double convex lens may also function as working distance lens 236, where the double convex lens possesses a +2.00/+0.50 power to achieve a +2.50 power. Similarly, working distance lens 236 may be a concave/convex lens where concave/convex the lens may possess a +3.00/−0.50 power to achieve a +2.5 power.

Figure 3A:
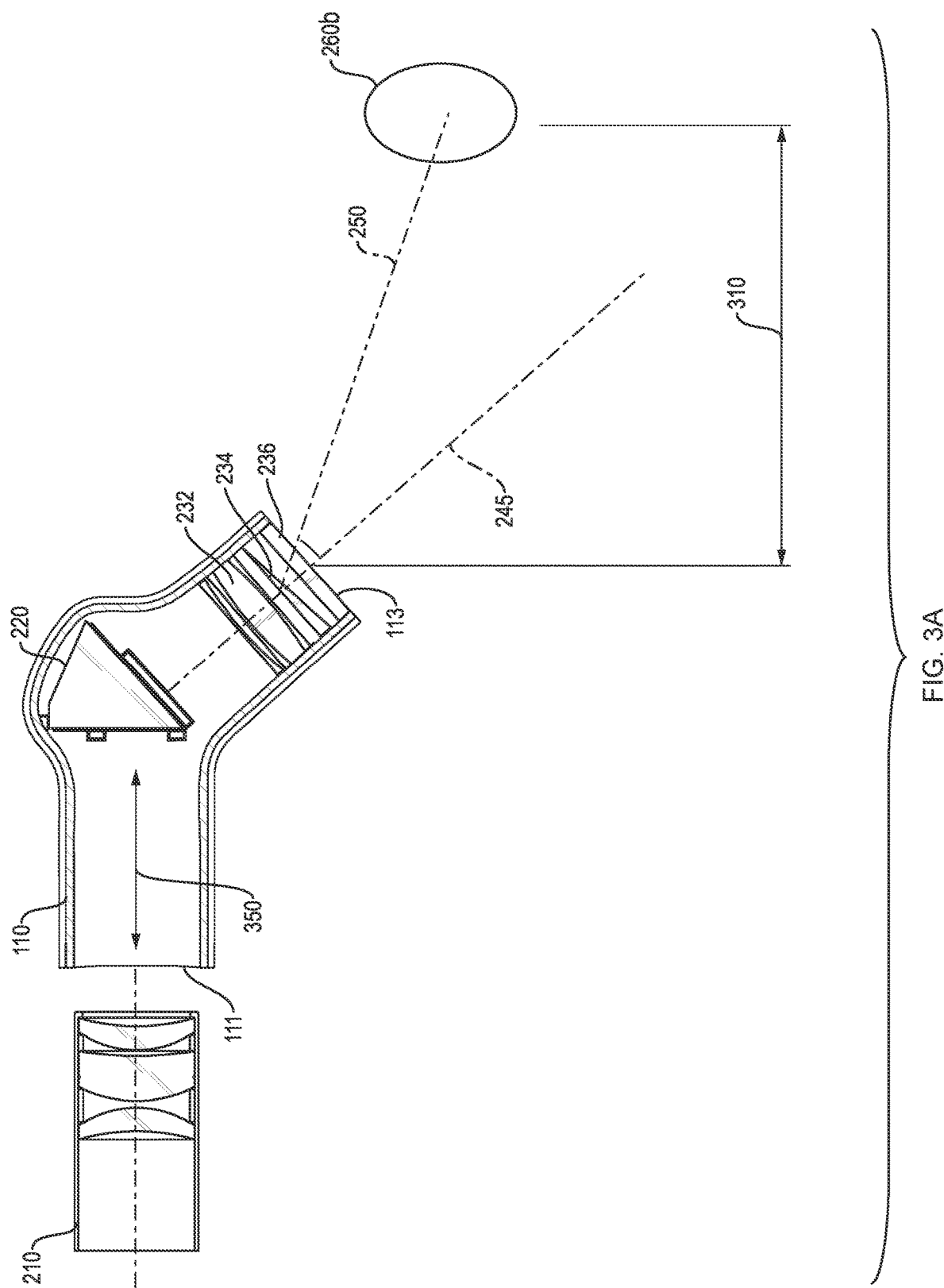
FIGS. 3A and 3B illustrate side views of the exemplary embodiment of the loupe shown in FIG. 1A wherein components shown in FIG. 2 are incorporated therein.

FIG. 3A illustrates a side view of first section 110, wherein components 232, 234, 236 of objective lens section 230 are incorporated into corresponding spaces 116a, 116b and 116c, respectively (see FIG. 1D). Further illustrated is prismatic lens 220 placed within space 116d and retained in place by elements 112a-112c; not shown is the ledge elements 160, which appropriately positions prismatic lens 220 along optical paths 240 and 250. Eyepiece assembly 210 further is shown as being insertable, into proximate end 111, wherein eyepiece assembly is slidable within loupe 100, as represented by element 350, to provide for a focusing of an object (260b) at a known working distance 310 from distal end 113 of loupe 100.

In this illustrated example, object 260b is offset from optical axis 245 (see FIG. 2) as wedge prism 234 is shown incorporated into space 116b (see FIG. 1D). However, it would be understood that wedge prism 234 is an optional element of objective lens assembly 230 and, hence, the position of object 260b may be altered with respect to distal end 113 (see FIG. 2, ele. 260a).

In accordance with the principles of the invention, first section 110 and second section 120 may be joined and with the include components 232, 234 and 236 form loupe or a magnification device 100 having known magnification level.

Eyepiece assembly 210 is slidable, as represented by element 350, within a proximate section of the combined first section 110 and second section 120 to allow for focusing of an object (not shown) at a known distance from distal end 113.

The joined first section 110 and second section 120 and eyepiece assembly 210 may be retained in a desired position by, for example, a gluing or adhesive process.

In one aspect of the invention, the joining process may comprise applying an adhesive to outer edges of at least one of said first section 110 and said second section 120 and pressing first section 110 and second section 120 together. In alternative embodiment, an adhesive may be applied to selected regions of an outer edge of at least one of said first section 110 and said second section 120. Alternatively, first section 110 and second section 120 may be joined by an ultra-sonic welding or may be joined by a snap-fit connection.

Figure 3B:
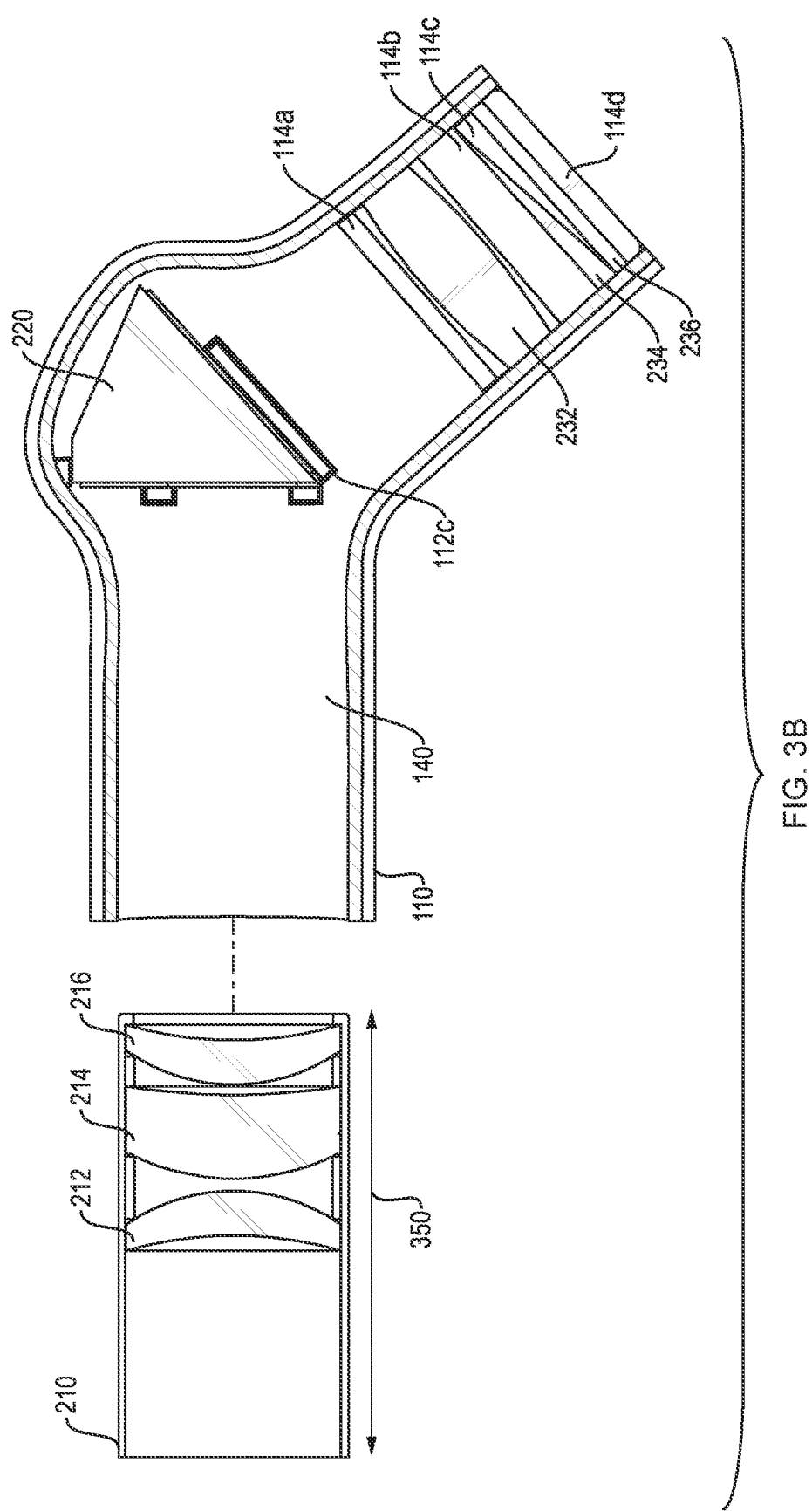

In accordance with the principles of the invention, the preforming of ridges and spaces within each of the first section 110 and second section 120, the placement of components therein and the joining of the first section 110 and second section 120 through an adhesive or ultra-sonic welding process provides a simpler and less costly method of constructing magnification device or loupe; in this illustrated example, a prismatic loupe. FIG. 3B, which is similar to FIG. 3A, illustrates ridges 114a-114d that are used to contain corresponding optical elements 232, 234, 236, respectively.

Figure 4A:
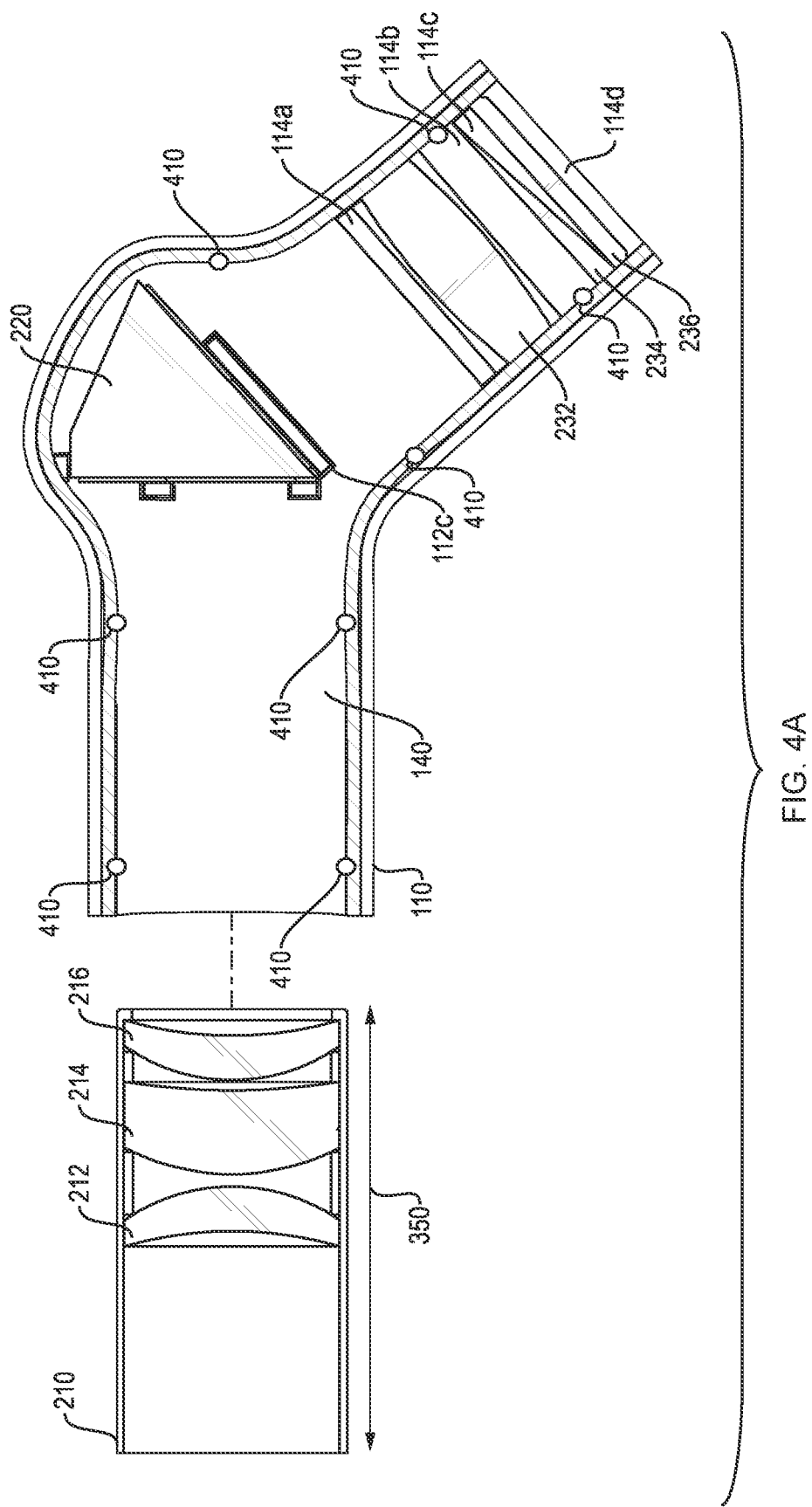
FIGS. 4A and 4B illustrate side views of a second exemplary embodiment of the loupe shown in FIG. 1A.
Figure 4B:
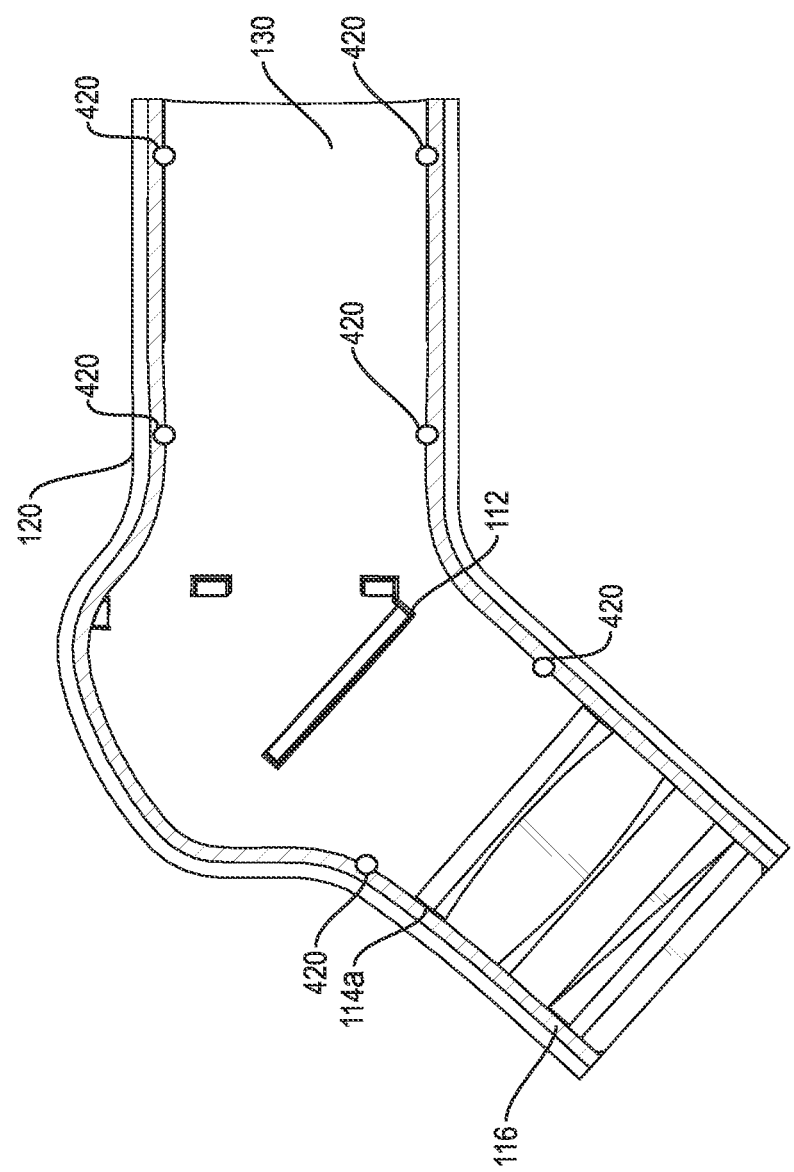

FIG. 4A illustrates a second aspect of the exemplary embodiment of first section 110 shown in FIG. 1A, wherein a plurality of engagement slots 410 are incorporated into edges of second section 110. FIG. 4B illustrates a plurality of engagement tabs 420 that may extend from first section 120, such that the engagement tabs 420 in second section 120 engage corresponding ones of the plurality of engagement slots 410 in first section 110 to retain first section 110 and second section 120 (i.e., a snap fit connection) together. An adhesive process, as discussed above, may further be incorporated to retain first section 110 and second section 120 together.

Figure 5A:
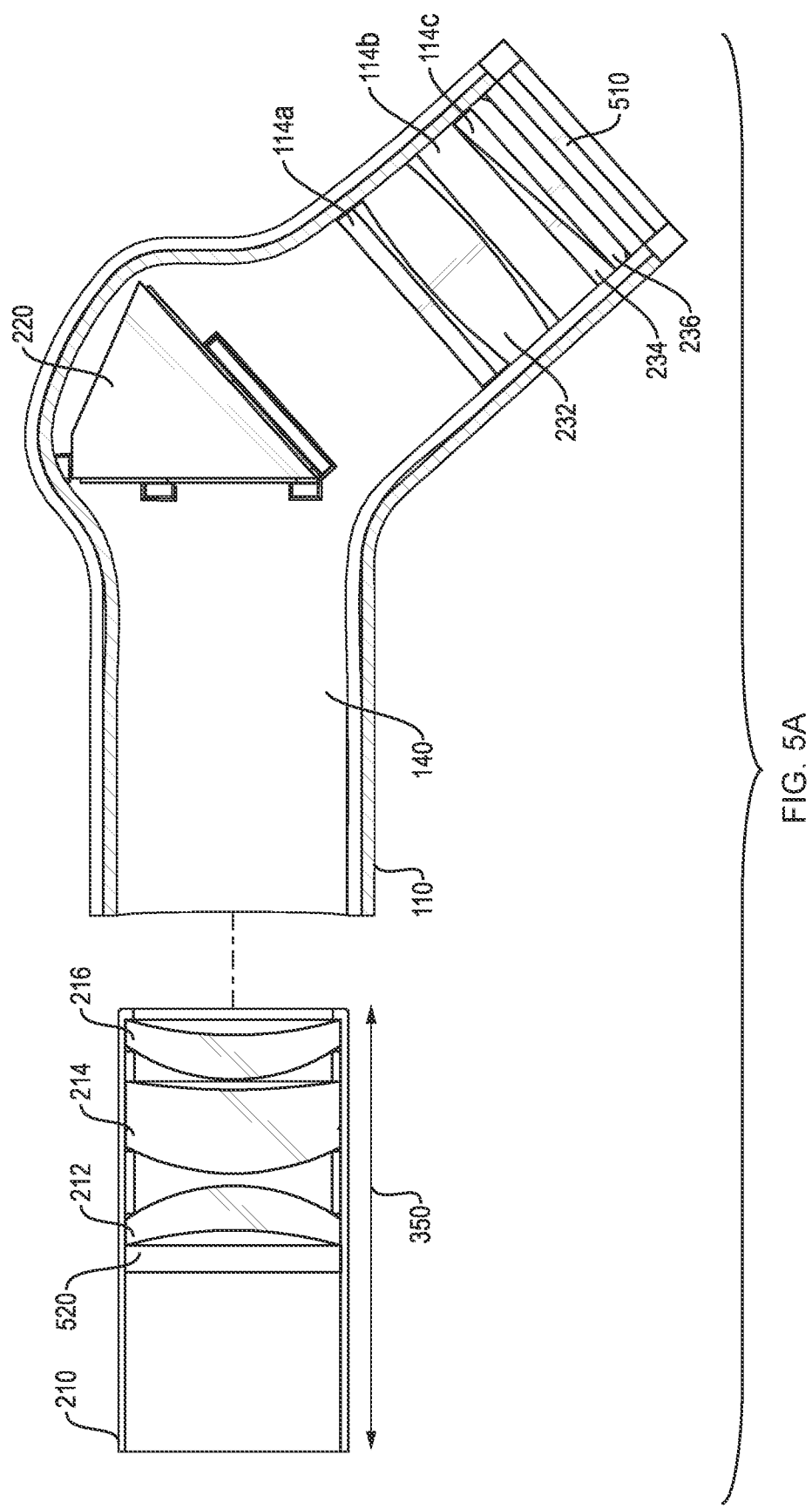
FIG. 5A illustrates a side view of a third exemplary embodiment of the loupe shown in FIG. 1A.

FIG. 5A illustrates another aspect of the exemplary embodiment of first section 110 shown in FIG. 1A, wherein a filter element 510 is incorporated into the objective lens section 230. Filter element 510 provides for the selected filtering (i.e., attenuation) of light viewed through the assembled magnification device. Further illustrated is filter element 520 incorporated into eyepiece assembly 210, wherein filter element 520 provides for further attenuation of light through the assembled magnification device.

Selection of the characteristics of filter elements 510 and 520 may be determined based on the desired light wavelength ranges to be viewed through the assembled magnification device (loupe). See for example U.S. Pat. Nos. 10,895,8735, 11,119,309 and 099,376, the contents of which are incorporated, herein, in their entirety, for determining the optical characteristics of filter elements 510 and 520.

Although two filter elements are shown, it would be recognized that a single filter element (510 or 520) may be sufficient to provide for the appropriate attenuation of light entering the assembled loupe.

FIG. 5B illustrates another aspect of the exemplary embodiment of first section 110 shown in FIG. 1A, wherein wedge prism 234 is shown external to loupe (telescopic lens) 100.

Figure 6:
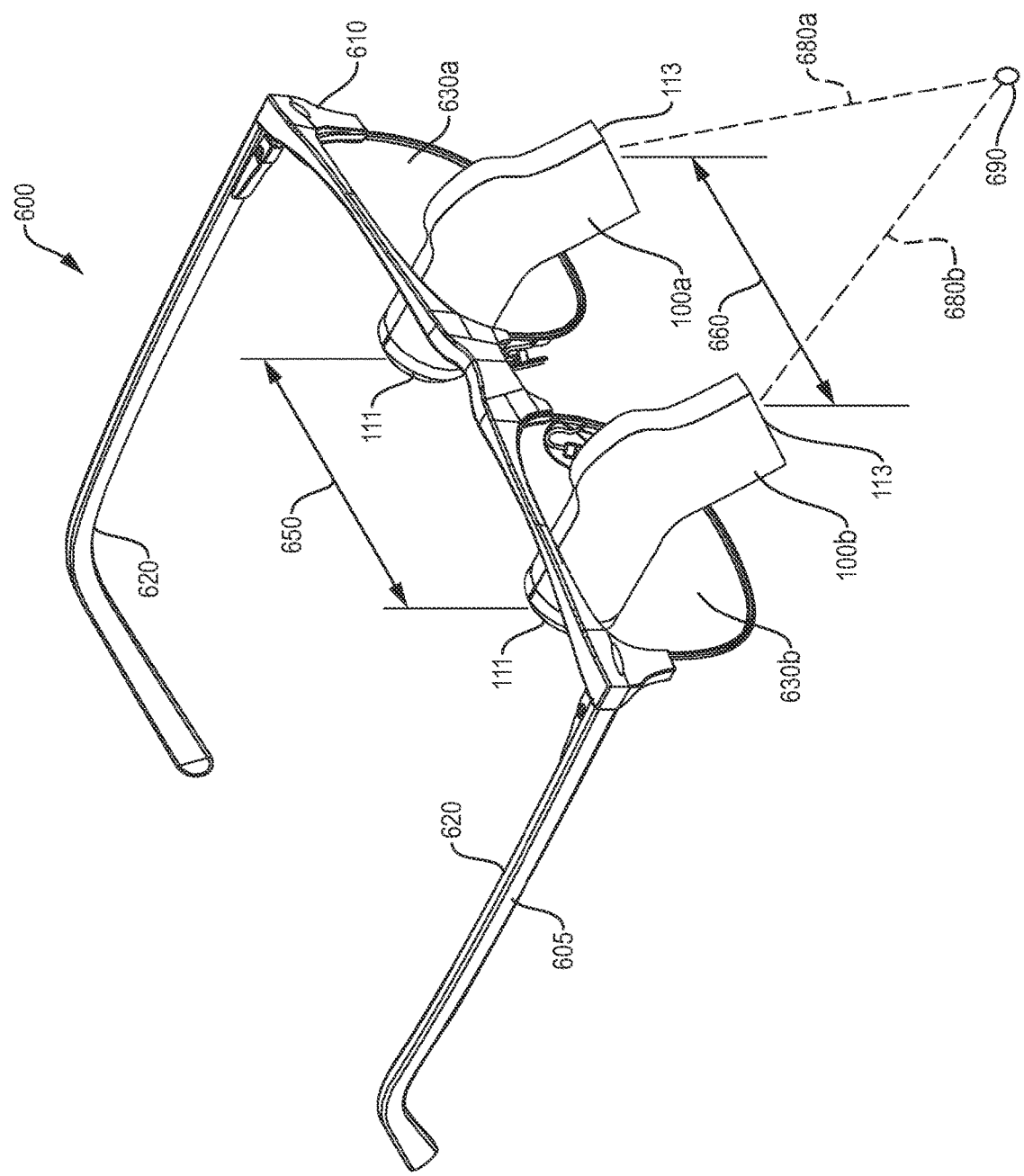
FIG. 6 illustrates a perspective view a prismatic telescopic lens eyewear configuration in accordance with the principles of the invention.

FIG. 6 illustrates an exemplary embodiment of a prismatic eyewear incorporate loupes in accordance with the principles of the invention.

In this illustrated embodiment, prismatic telescopic eyewear 600 comprises eyewear 605 comprising frame 610 and temple elements 620, wherein temple elements 620 retain eyewear 605 to a user (not shown). Frame 610 comprises a left lens 630a and right lens 630b, wherein prismatic telescopic lens elements 100 (for example, shown in FIG. 1A and referred to as elements 100a, 100b) are incorporated through lenses 630a, 630b, respectively.

Further illustrated, is distance 650 between the optical centers of the proximal ends 111 of prismatic telescopic lens elements 100a and 100b and distance 660 between the optical centers of distal ends 113 of prismatic telescopic lens elements 100a, 100b. Distance 650, referred to as the inter-pupillary distance, represents the distance between a user's pupils. In conventional telescopic eyewear, distance 660 is generally less than distance 650 as the eyewear incorporating conventional telescopic lens requires the distal ends 113 of the telescopic lenses are oriented inwardly to converge light progressing from an object 690 along optical paths 680a, 680b to provide a binocular view of an object 690.

Accordingly, in one aspect of conventional eyewear, the prismatic lenses are oriented inwardly (bending) with respect to a horizontal line (not shown) substantially perpendicular to each of lenses 630a, 630b to force distance 660 to be less than distance 650. In another aspect of conventional telescopic eyewear, the telescopic lenses are rotated inwardly wherein the inward orientation or rotation of telescopic elements forces distance 660 to be less than distance 650 for the collimation of the light emanating from object 690.

However, in accordance with the principles of the invention, the incorporate the wedge or base-in element 234 (see FIG. 2) allows for the orientation of telescopic lenses 100a, 100b to be in a parallel relationship, such that distance 650 and 660 are substantially equal.

Figure 7A:
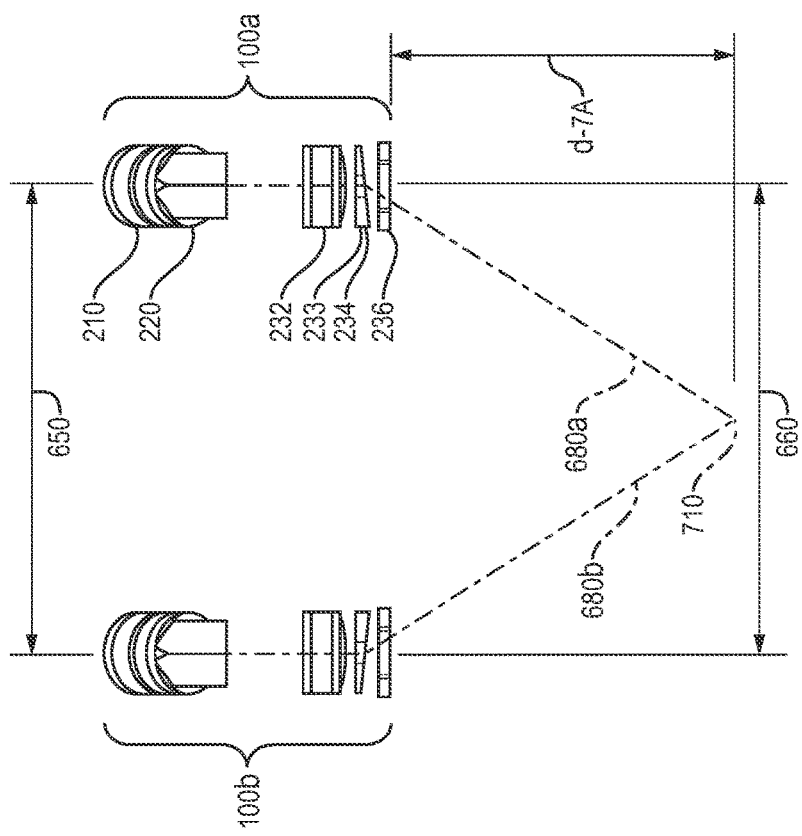
FIG. 7A illustrates a top view of a first aspect of an exemplary telescopic lens configuration shown in FIG. 6 in accordance with the principles of the invention.

FIG. 7A illustrates a top view of a first aspect of an exemplary telescopic lens configuration shown in FIG. 6 in accordance with the principles of the invention.

In this illustrated aspect, telescopic lenses 100a, 100b are positioned apart in a parallel relationship, at a distance 650/660, as previously discussed, wherein a focal point 710 of telescopic lenses 100a, 100b is shown at a distance, d-7A, from the working distance lens 236.

As illustrated, telescopic lens 100a, 100b are neither oriented (bended) nor rotated toward focal point 710. Rather, the distance 660 between the centers of distal ends 113 of telescopic lens 100a, 100b is equal to the distance 650 between the centers of proximal ends 111 of telescopic lens 100a, 100b Accordingly, light emanating from an object (not shown) at focal point 710 is captured by working distance lens 236 and applied to wedge prism 234, which alters or bends the direction of the light from the viewed object 690 at focal 710 to render the emitted light substantially perpendicular to prism 220. Prism 220 further alters the direction of the emitted light to enter eyepiece assembly 210.

Figure 7B:
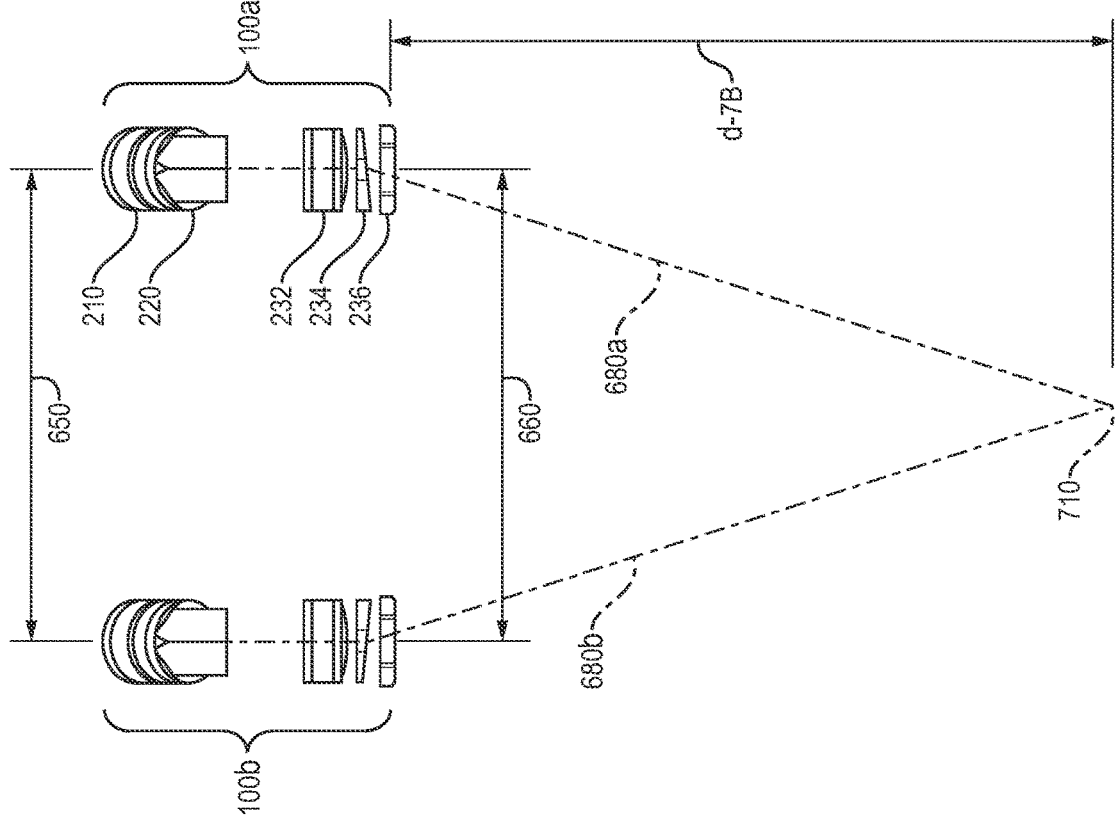
FIG. 7B illustrates a top view of a second aspect of an exemplary telescopic lens configuration in accordance with the principles of the invention.

FIG. 7B illustrates a top view of a second aspect of an exemplary telescopic lens configuration in accordance with the principles of the invention.

In this second aspect, telescopic lenses 100a, 100b are in a parallel relationship, wherein the distance 650 between the proximate ends 111 (see FIG. 6) is the same as the distance 660 between the distal ends 113 (see FIG. 6).

Telescopic lenses 100a, 100b further comprise eyepiece assembly 210, prism 220, objective lens 232, wedge or base-in prism 234 and working distance lens 236. In this illustrated example, focal point 710 is positioned at distance, d-7B, from working lens 236.

As the distance d-7b is greater than d-7a, the characteristics of both the working distance lens 236 and the wedge prism 234 are different between the configurations shown in FIGS. 7A and 7B.

In one aspect, the characteristics of the working distance lens 236 are determined based on the desired distance (i.e., d-7A, d-7b) between the desired focal point (710) and a distal end 113 of telescopic lenses 100a, 100b. In addition, the characteristics of the wedge prism 234 may be determined based on the distance to focal point 710 and the required degree of alteration (or bending) of the path of the light emanating from object 690 (see FIG. 6) at focal point 710.

For example, in the illustrated aspects of FIGS. 7A and 7B, wedge prism 234 of FIG. 7A requires a greater degree of altering or bending of the light emanating from an object at focal point 710. Hence, prism 234 shown in FIG. 7A requires a prismatic wedge element 234 that causes a greater alteration in the direction of the light passing therethrough than the wedge prism element 234 shown in FIG. 7B.

For example, wedge prism 234 shown in FIG. 7B is of a less power than the wedge prism 234 shown in FIG. 7A. In addition, wedge prism 234 shown FIG. 7B possess a base element that is smaller than the base element of wedge prism 234 shown in FIG. 7A. Further, the working distance shown in FIG. 7B is of a less power than the working distance shown in FIG. 7A.

In accordance with the principles of the invention, the wedge prism elements 234 are positioned within the telescopic lens 100a, 100b in a "base-in" configuration, wherein the term "base-in" refers to the position of a base element of wedge prism element 234.

In this illustrated case, the base element 233 of wedge element 234 associated with telescopic lens 100a is positioned toward telescopic lens 100b. Similarly, base element 233 of wedge element 234 associated with lens 100b is positioned toward telescopic lens 100a.

In accordance with the principles, wedge prism elements 234 in each of telescopic lens 100a, 100b, collimate the light emanating from an object 690 focal point 710, wherein it would be understood that the use of focal point 710 is only for purposes of illustrating the exemplary embodiments of the invention claimed and that focal point 710 refers to a point within an area about focal point 710 in which an object 690 is located. This area defines a depth of field of the illustrated telescopic lenses. For example, focal point 710 may represent a distance of approximately 17 inches from telescopic lens 100a, 100b, and objects 690 within a region, for example, of 17-20 inches from the telescopic lens 100a, 100b may be considered "in-focus" when viewed through telescopic lens 100a, 100b.

Figure 8:
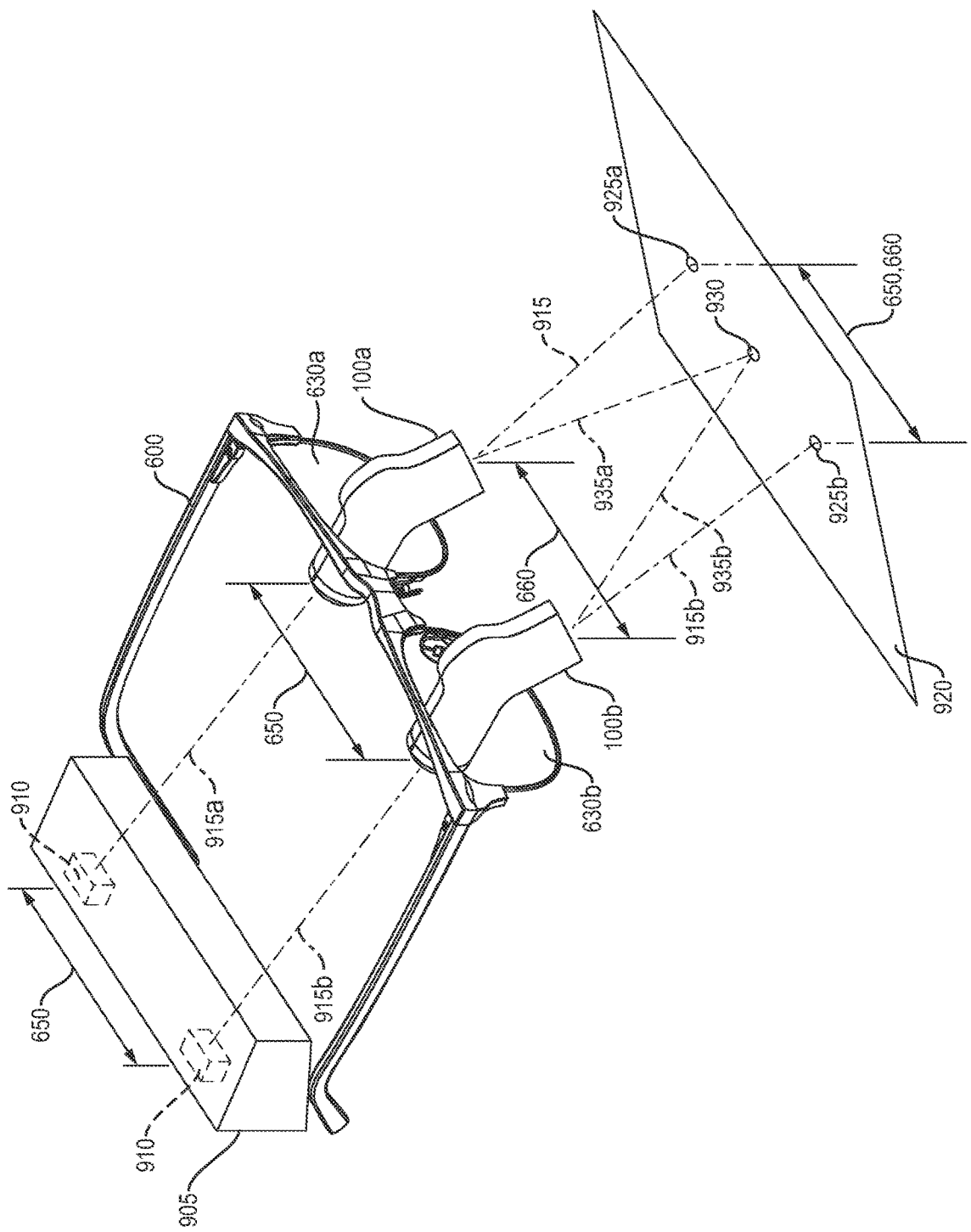
FIG. 8 illustrates an exemplary test setup for constructing a prismatic telescopic lens eyewear system in accordance with the principles of the invention.

FIG. 8 illustrates an exemplary test setup for constructing a prismatic telescopic lens eyewear system in accordance with the principles of the invention.

In accordance with the principles of the invention, eyewear 600 comprises eyewear lens 630a, 630b into which are inserted prismatic telescopic lenses 100a, 100b, respectively. Telescopic lenses 100a, 100b are in a parallel relationship to each other, wherein the distance 650 between the proximal ends 111 of lenses 100a, 100b is the same as the distance 660 between the distal ends 113 of lenses 100a, 110b. A light bench 905 comprises a plurality of light sources 910 that are adjustably positioned a known distance apart. In this illustrated case, the distance between the light sources is the same distance as the distance 650 between telescopic lenses 100a, 100b.

Light emitted by each of lights sources 910 along optical paths 915a, 915b passes through telescopic lenses 100a, 100b, respectively, and is projected onto t plane 920, a known distance from telescopic lenses 100a, 100b. Image points 925a, 925b represent images of the light projected onto plane 920 through telescopic lenses 100a, 100b. In this illustrated example, the images of light 925a, 925b are also separated by the distance 650 (660) between telescopic lenses 100a, 100b due to the parallel alignment of lenses 100a, 100b. The measurement of the distance between image points 925a, 925b being the same as the distance between the centers of telescopic lens 100a, 100b confirms and validates the parallel configuration of telescopic lenses 100a, 100b.

In accordance with the principles of the invention, one on more wedge prism elements (not shown) may be inserted onto the distal end of telescopic lenses 100a, 100b to alter the optical light paths 915a, 915b to light paths 935a, 935b (see FIG. 2) so as to converge the light emitted by light sources 910 onto a desired image point 930; image point 930 being substantially centered between image points 925a, 925b.

Accordingly, with the introduction of wedge prism elements 234 (not shown) into the illustrated telescopic lens 100a, 100b and, thus, forming telescopic lens 100a, 100b in accordance with the principles of the invention, a binocular or stereoscopic image of an object placed at image point 930 (or within the depth of focus of image point 930) may be obtained.

In one aspect of the invention, a telescopic lens 100a, 100b may be pre-formed with the inclusion of wedge prism elements 234 (not shown) having characteristics to alter the optical path of light to focus light from the pair of telescopic lens toward center point 930. In this aspect of the invention, light emitted by sources 910 is expected to be projected onto image point 930. Accordingly, the position of lenses within lens 100a, 100b, which are in a parallel relationship of telescopic lens 100a, 100b to cause the light emitted by sources 910 to project onto image point 930.

Figure 9:
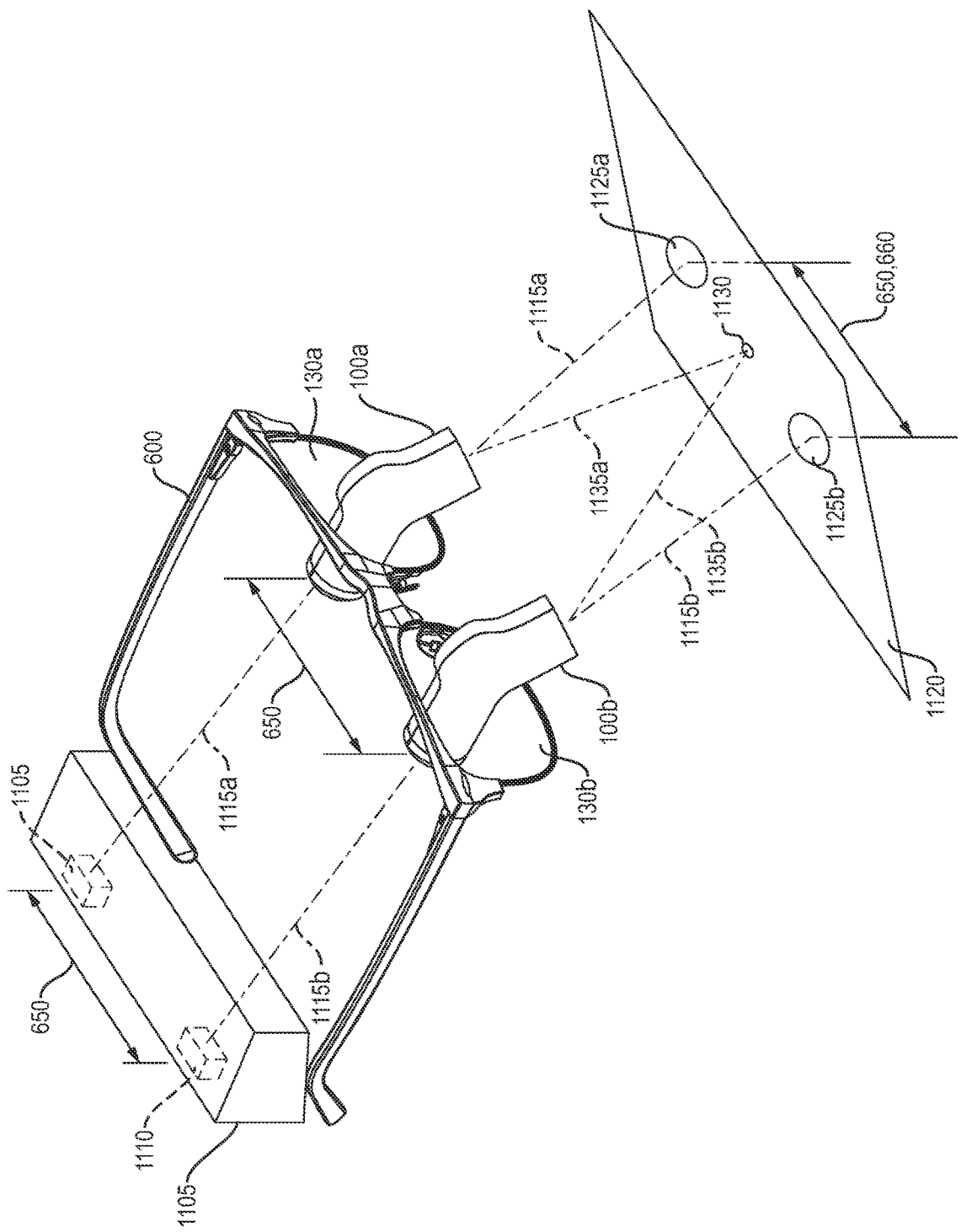
FIG. 9 illustrates a second exemplary embodiment of a test setup configuration for constructing a telescopic lens eyewear in accordance with the principles of the invention.

FIG. 9 illustrates a second exemplary embodiment of a test setup configuration for constructing a telescopic lens eyewear in accordance with the principles of the invention.

In this illustrated second exemplary embodiment, a calibration plate 1120, which is positioned a known distance from the distal ends 113 of telescopic lens 110a, 100b, includes a plurality of images 1125a, 1125b, wherein the center points of images 1125a, 1125b are separated by a known, calibrated, distance 650/660. The specific calibrated distance 650 of calibration plate 1120 is comparable to an expected inter-pupillary distance of a user. And thus, a plurality of calibration plates 1120 may be formulated with different distances 650.

A photo-optical sensor plate 1110 comprising photo-optical sensors 1105, which are separated by the inter-pupillary distance of a user, may optically view, through telescopic lenses 100a, 110b, light emanating along corresponding optical paths 1115a, 1115b images 1125a, 1125b positioned on calibrated plate 1120. Optical sensors 1105 may provide instruction, based on the viewed images, to adjust the relationship of lens 100a, 100b to place lens 100a, 100b in a parallel relationship.

In accordance with the principles of the invention, one on more wedge prism elements (not shown) may be inserted onto the distal end of telescopic lenses 100a, 100b to alter the optical light paths 1115a, 1115b to light paths 1135a, 1135b to cause the light emitted by images 1125a, 1125b to be to visually merge into a single image at point 1130 on plate 1120.

In accordance with another aspect of the invention, images 1125a, 1125b may be viewed by the eyes of a user, wherein the user may adjust the telescopic lens 100a, 100b into a parallel relationship. Wedge prism elements (not shown) may then be inserted onto the ends of lenses 100a, 100b, wherein the user may view a merged image of images 1125a, 125b along optical paths 1135a, 1135b.

Figure 10:
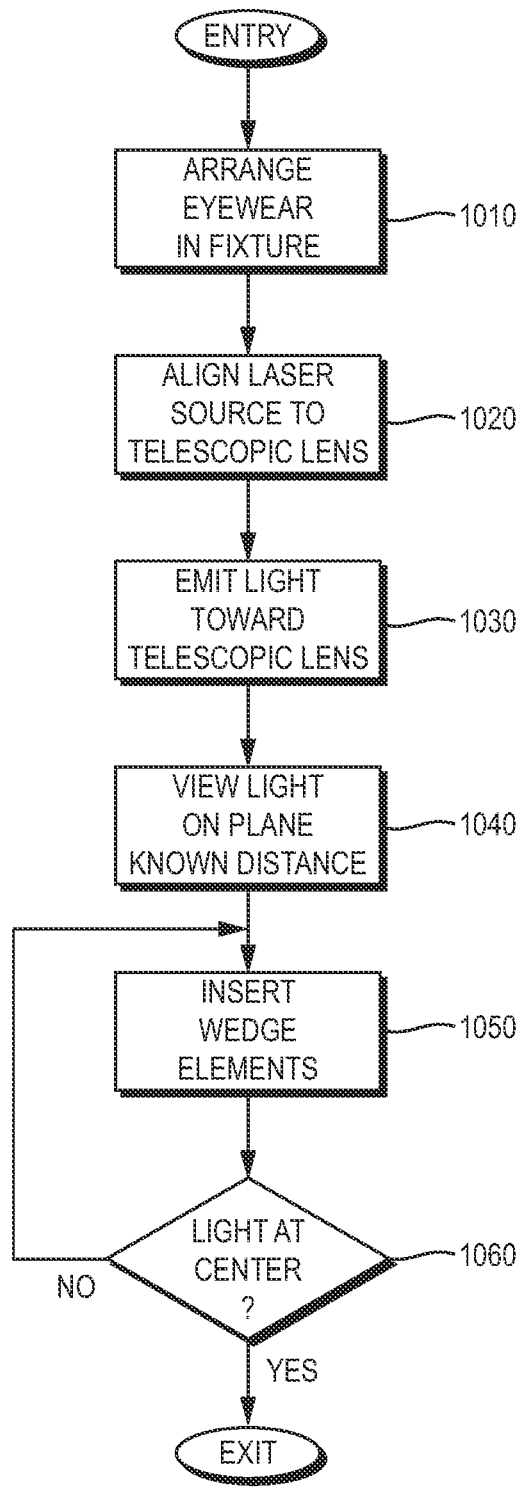
FIG. 10 illustrates an exemplary process for constructing a prismatic telescopic lens eyewear system in accordance with the principles of the invention.

FIG. 10 illustrates an exemplary process for constructing a prismatic telescopic lens eyewear system in accordance with the principles of the invention.

At step 1010, a telescopic lens eyewear system is arranged in a fixture where the distance between the centers of the telescopic lenses is measured. At step 1020, a plurality of laser light sources are separated by the measured distance between the telescopic lenses. At step 1030, the light sources are further adjusted to emit light at a known point on the surface of the eyepiece assembly of each of the telescopic lenses. For example, the light may be projected at substantially the center of each of the eyepiece assemblies. Alternatively, the light may be projected a known distance (above or below) the center of each of the eyepiece assemblies.

At step 1040, the light projected through each of the telescopic lenses is viewed on a plane a known distance from the distal ends of the telescopic lenses. In one aspect of the invention, the known plane may include a calibration scale, which provides an indication of a center point onto which the projected light is to be focused.

At step 1050, one or more wedge prisms may be inserted onto a distal end of each of the telescopic lenses, wherein the inserted wedge prisms alter the optical path of the light emitted to converge the emitted light onto a known image point.

At step 1060, a determination is made whether the light has converged onto a center point between the telescopic lenses. If the answer is negative, then the process continues at step 1050. Otherwise, the light from the light sources has converged onto a center point between the telescopic lenses and the process is ended.

With the introduction of an appropriately sized wedge prisms, collimating of the light emanating from an object (not shown) at a focal point may be obtained without requiring the orientating or rotation of the telescopic lenses toward the focal point.

In one aspect of the invention, the wedge prism elements determined to provide for appropriate orientation of the optical light path may be attached directly to the distal end of a corresponding one of the telescopic lenses (see FIG. 5A). In another aspect of the invention, the wedge prisms elements determined to provide for appropriate orientation of the optical light path may be contained internal to the telescopic lenses (see FIG. 1A, for example).

Figure 11:
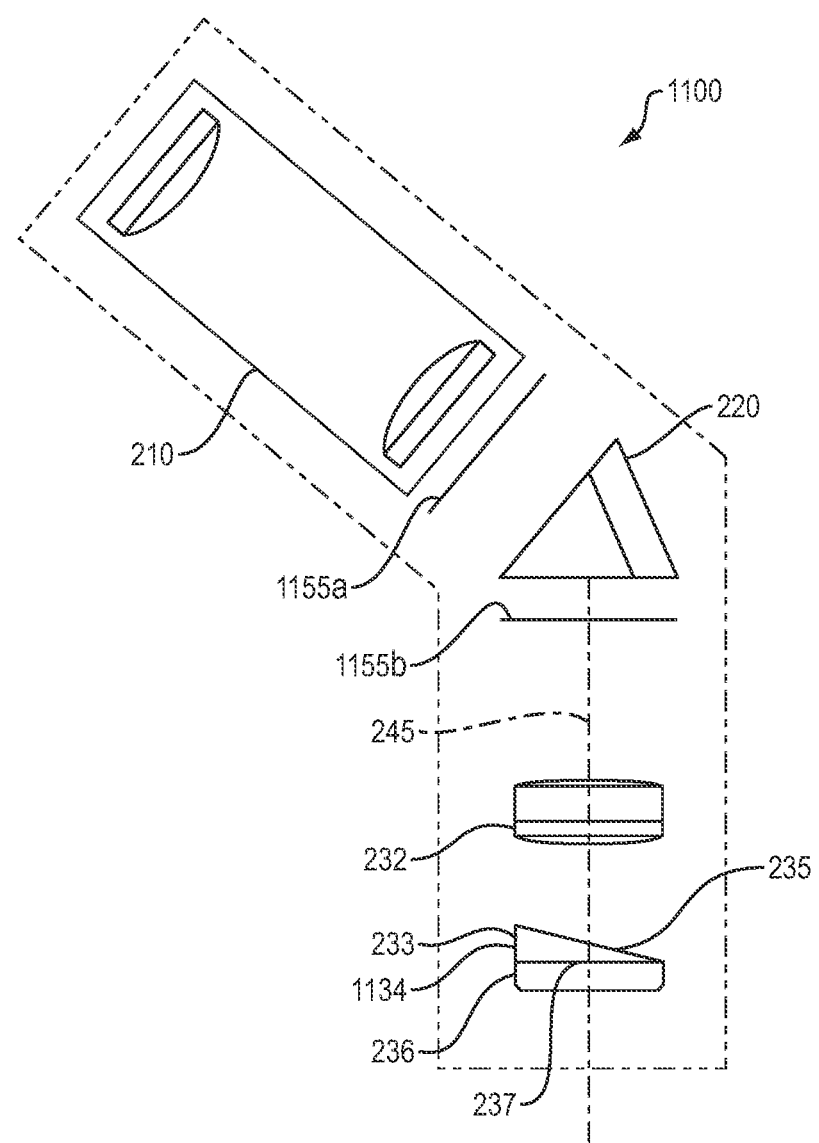
FIG. 11 illustrates a second aspect of the embodiments of a telescopic lens disclosed, herein.

FIG. 11 illustrates a second aspect of the embodiments of a telescopic lens disclosed, herein.

In this illustrated aspect of a telescopic lens configuration 1100 includes an eyepiece assembly 210, a prismatic lens 220 and an object lens assembly comprising an objective lens 232 and a working distance lens 236, similar to the telescopic lens configuration previously discussed.

In this second aspect of the invention, a wedge prism lens 1134 is shown vertically flipped from the positioning of wedge lens 234 shown in FIG. 2, such that light exiting objective lens 232 impinges upon the hypotenuse surface 235 of wedge prism lens 1134 and leg 237 faces outward.

Further, illustrated is working distance lens 236 integrally attached to the leg 237 of wedge prism lens 1134. In one aspect of the invention, where lens 236 is a Plano/convex lens (as previously discussed), the Plano surface of lens 236 may be attached to leg 237 by the use of an optically clear adhesive, for example. In another aspect of the invention, lens 236 comprises a front convex of a desired power and the rear is ground (or grinded) into a shape similar to the wedge prism 1134 having a base element 233 and a hypotenuse 237. as shown.

Still further illustrated at least one aperture element 1115 (referred to as 1115a, 1115b) which may be used to define the light being viewed through telescopic lens 100a, 100b. In one aspect of the invention, the aperture element 1115 may be adjustable to limit or allow a greater amount of light to be viewed through lenses 100a, 100b.

Figure 12:
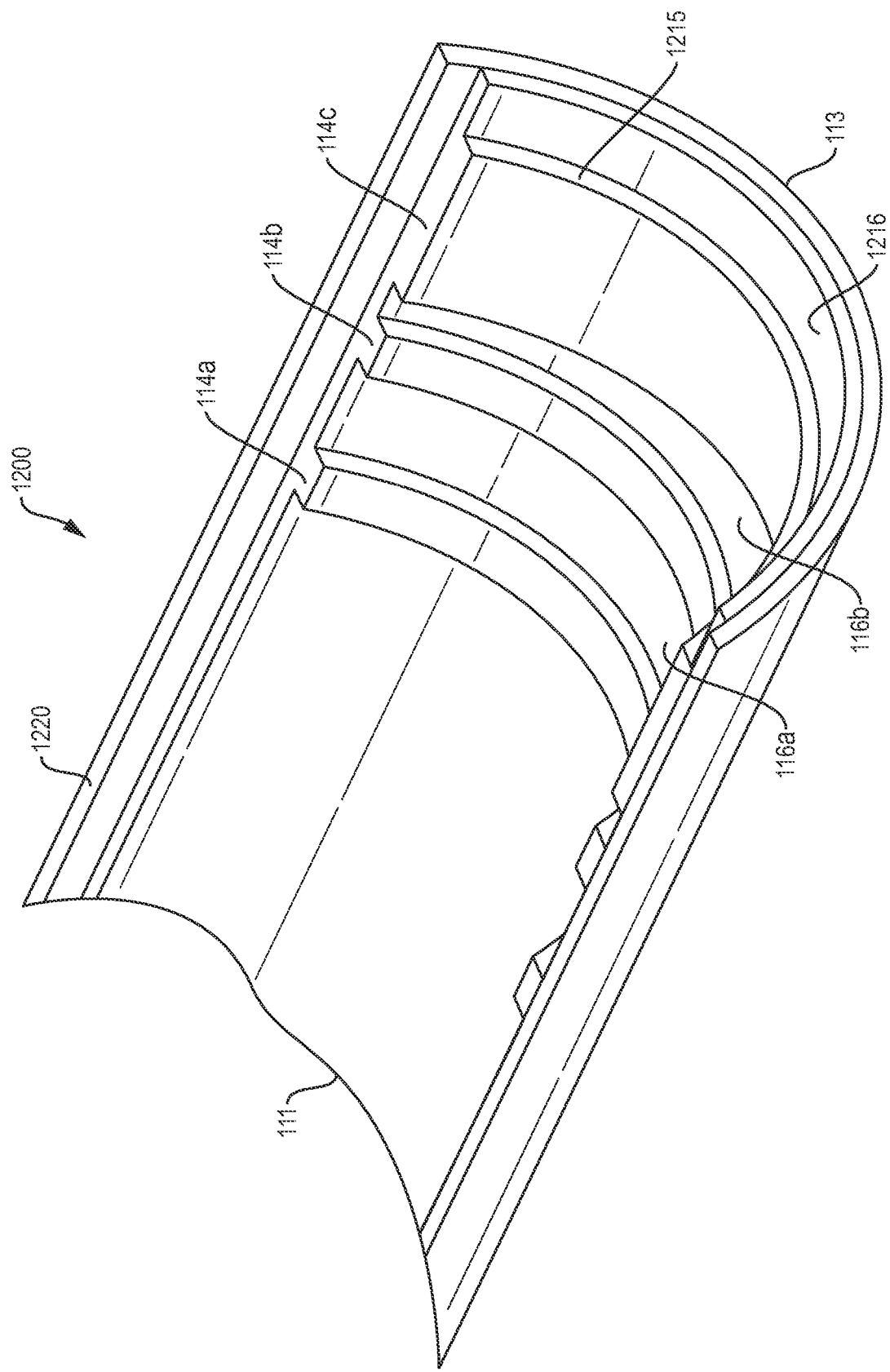
FIG. 12 illustrates a cut-away perspective view of a second exemplary embodiment of a loupe in accordance with the principles of the invention.

FIG. 12 illustrates a cut-away perspective view of a second exemplary embodiment of a loupe in accordance with the principles of the invention.

In this illustrated second exemplary embodiment, loupe element 1200 (not shown) comprises left section 1210 (not shown) and right section 1220, similar to the loupe element 100 shown in FIG. 1A. In this second exemplary embodiment loupe element 1200 (not shown) is linear, wherein an eyepiece assembly, similar to that shown in FIG. 1A, may slide into the proximal end 111 of loupe element 1200 (not shown).

In accordance with the principles of the invention, ridge or rib element 114a, 114b and 114c are formed in an inner surface of right section 1220 in a manner similar to that as previously discussed. Ribs 114a-114c form spaces 116a, 116b therebetween. As discussed, space 116b is formed in a triangular manner to accommodate a wedge prism 234 (see FIG. 2).

In this illustrated second exemplary embodiment rib 114d (see FIG. 1E) is not shown. Rather, a space 1216 is formed between distal end 113 and a shoulder 1215 of rib 114c. Within space 1216, working distance lens 236 (not shown) may be placed, wherein working distance lens 236 is adhesively attached to shoulder 1215.

As would be recognized, rib element 114d may be incorporated into the illustrated right section 1220 in a manner similar to that shown in FIG. 1E. In this space 116c (not shown) is formed and space 1216 may be used to accommodate a filter element 510 (sed FIG. 5B), as previously discussed.

In accordance with the principles of the invention, loupes 1200 may be constructed by the joining of left section 1210 (not shown) and right section 1220, in a manner similar to that previously discussed. In addition, loupes 1200 may be incorporated into eyewear as shown in FIG. 6.

In summary, a method for assembling magnification devices (loupes) is discussed, wherein the method comprising forming sectional elements, which comprise a plurality of ridges (or ribs) that form spaces, therebetween. Optical components may be placed within the spaces formed by the ridges and the sectional elements may be joined together through a snap-fit, a gluing process or ultra-sonic welding such that the optical components are held in place between the sectional elements. Further disclosed is an eyepiece assembly that is slidable within the joined section elements 110, 120 to focus an object at a known distance from a distal end of the loupe.

In addition, an eyewear incorporating the telescopic lens is disclosed, wherein the telescopic lens are physically positioned in a parallel manner and the base-in prism elements optically alter (or bend) the optical axis achieve a binocular image of an object being viewed from the telescopic lens.

Furthermore, a method for aligning and determining the characteristics of the base-in prism element is disclosed to achieve a binocular image of an object being viewed at a known distance from the telescopic lens.

Although the invention disclosed herein refers to a prismatic loupe, it would be understood that the method of assembling a loupe or magnification device discussed is also applicable to magnification devices are linear, i.e., the optical axis between the eyepiece lens assembly and the objection lens is a straight line.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above regarding specific embodiments. The benefits, advantages, and solutions to problems, and any element(s) that may cause any benefits, advantages, or solutions to occur or become more pronounced, are not to be construed as a critical, required, or an essential feature or element of any or all of the claims.

What is claimed is:

1. A telescopic lens eyewear system comprising:
an eyewear comprising:
a plurality of lenses;
a telescopic lens incorporated into each of the plurality of lenses, wherein the telescopic lenses are in a parallel relationship to each other, each of said telescopic lenses comprising:
an eyepiece assembly comprising:
at least one eye-lens;
an objective lens, comprising:
at least one lens,
a prism positioned between the eyepiece assembly and the objective lens, wherein an optical axis is formed between the eyepiece assembly and the objective lens through the prism, the optical axis comprising:
a first section between the eyepiece assembly and the prism; and
a second section between the prism and the objective lens, the prism altering a direction of the first section of the optical axis;
a wedge prism positioned within the second section of the optical axis, the wedge prism configured to:
alter a direction of the second section of the optical axis; and
a working distance lens positioned within the second section of the optical axis, the working distance lens configured to:
establish a known distance at which the telescopic lens is focused upon.

2. The telescopic lens eyewear of claim 1, wherein characteristics of the wedge prism being based on the known distance from the working distance lens.

3. The telescopic lens eyewear of claim 1, wherein the wedge prism is positioned external to the working distance lens.

4. The telescopic lens eyewear of claim 1, wherein the wedge prism is positioned internal to the working distance lens.

5. The telescopic lens eyewear of claim 1, wherein the wedge prism is integral to said working distance lens.

6. A telescopic lens eyewear system comprising:
an eyewear comprising:
a left lens comprising:
a left telescopic lens, the left telescopic lens configured to:
magnify an image of an object at a known distance from the left telescopic lens; and
a right lens comprising:
a right telescopic lens the right telescopic lens configured to:
magnify the image of the object at the known distance from the right telescopic lens, wherein the left telescopic lens and the right telescopic lens are in a parallel relationship to each other, each of the left telescopic lens and the right telescopic lens comprising:
an eyepiece assembly,
an objective lens, the eyepiece assembly and the objective lens forming an optical axis therebetween;
a prism positioned between the eyepiece assembly and the objective lens, the prism configured to:
alter a first direction of the optical axis formed between eyepiece assembly and the prism toward a second direction of the optical axis formed between the objective lens and the prism;
a wedge prism positioned within the second direction of the optical axis, wherein the wedge prism is positioned base-in in a corresponding one of said left telescopic lens and said right telescopic lens, wherein the wedge prism is configured to:
alter the second direction the optical axis by shifting the optical axis a desired amount toward an opposite one of the left telescopic lens and the right telescopic lens; and
a working distance lens configured to:
establish a known distance from the working distance lens, wherein an object positioned at the known distance between the left telescopic lens and the right telescopic lens along the second direction of the optical axis of a corresponding one of the left telescopic lens and the right telescopic lens.

7. The telescopic lens eyewear of claim 6, wherein the wedge prism is positioned external to a corresponding one of the left telescopic lens and the right telescopic lens.

8. The telescopic lens eyewear of claim 6, wherein the wedge prism is positioned internal to a corresponding one of the left telescopic lens and the right telescopic lens.

9. The telescopic lens eyewear of claim 6, wherein characteristics of the wedge prism are determined based on said known distance and a distance between centers of the left telescopic lens and the right telescopic lens.

10. The telescopic lens eyewear of claim 6, wherein the wedge prism and the working distance lens are integral.

11. The telescopic lens eyewear of claim 6, wherein the eyepiece assembly is slidable within a proximal section of a corresponding one of said left telescopic lens and the right telescopic lens.

12. The telescopic lens eyewear of claim 6, wherein each of the left telescopic lens and the right telescopic lens comprises:
a filter configured to attenuate at least one light wavelength.

13. The telescopic lens eyewear of claim 12, wherein the filter comprises:
a distal end filter; and
a proximal end filter.

14. The telescopic lens eyewear of claim 6 wherein each of the left telescopic lens and the right telescopic lens comprises:
at least one aperture.

15. A telescopic lens eyewear system comprising:
an eyewear comprising:
a left lens comprising:
a left telescopic lens, the left telescopic lens configured to:
magnify an image of an object at a known distance from the left telescopic lens; and
a right lens comprising:
a right telescopic lens the right telescopic lens configured to:
magnify the image of the object at the known distance from the right telescopic lens, wherein the left telescopic lens and the right telescopic lens are in a parallel relationship, each of the left telescopic lens and the right telescopic lens comprising:

an eyepiece assembly, wherein said an eyepiece assembly is slidable within a proximal section of a corresponding one of said left telescopic lens and said right telescopic lens;

an objective lens, the eyepiece assembly and the objective lens forming an optical axis therebetween;

a wedge prism, wherein the wedge prism is positioned base-in in a corresponding one of said left telescopic lens and said right telescopic lens, wherein the wedge prism is configured to:

alter the optical axis by a desired amount toward an opposing one of the left telescopic lens and the right telescopic lens; and a working distance lens configured to:

establish a known distance from the working distance lens.

16. The telescopic lens of claim 15, comprising:

a prism positioned between the eyepiece assembly and the objective lens, the prism configured to:

alter, along a first direction, the optical axis between the objective lens and the eyepiece assembly.

17. A telescopic lens eyewear system comprising:

an eyewear comprising:

a left lens comprising:

a left telescopic lens, the left telescopic lens configured to:

magnify an image of an object at a known distance from the left telescopic lens; and a right lens comprising:

a right telescopic lens the right telescopic lens configured to:

magnify the image of the object at the known distance from the right telescopic lens, wherein the left telescopic lens and the right telescopic lens are in a parallel relationship, each of the left telescopic lens and the right telescopic lens comprising:

an eyepiece assembly, an objective lens, the eyepiece assembly and the objective lens forming an optical axis therebetween;

a prism positioned between the eyepiece assembly and the objective lens, the prism configured to:

alter, along a first direction, the optical axis between the objective lens and the eyepiece assembly;

a wedge prism, wherein said wedge prism is positioned base-in in a corresponding one of said left telescopic lens and said right telescopic lens, a working distance lens; and a filter configured to attenuate at least one light wavelength.

18. The telescopic lens eyewear of claim 17, wherein said filter comprises:

a distal end filter; and a proximal end filter.

\* \* \* \* \*